United States Patent
Burris et al.

(10) Patent No.: US 9,687,918 B2
(45) Date of Patent: Jun. 27, 2017

(54) CORING AUGERS AND TOOLS FOR PREPARING AN END OF A COAXIAL CABLE FOR INTRODUCTION OF A FLOWABLE MEDIUM INTO THE END

(71) Applicant: Corning Optical Communications RF LLC, Glendale, AZ (US)

(72) Inventors: Donald Andrew Burris, Peoria, AZ (US); Thomas Dewey Miller, Peoria, AZ (US)

(73) Assignee: Corning Optical Communications RF LLC, Glendale, AZ (US)

( * ) Notice: Subject to any disclaimer, the term of this patent is extended or adjusted under 35 U.S.C. 154(b) by 44 days.

(21) Appl. No.: 14/923,508

(22) Filed: Oct. 27, 2015

(65) Prior Publication Data

US 2016/0118727 A1  Apr. 28, 2016

Related U.S. Application Data

(60) Provisional application No. 62/069,553, filed on Oct. 28, 2014.

(51) Int. Cl.
| | |
|---|---|
| *B23P 23/00* | (2006.01) |
| *B23Q 41/00* | (2006.01) |
| *B23B 51/08* | (2006.01) |
| *B23B 51/02* | (2006.01) |
| *H01R 43/28* | (2006.01) |
| *H01R 24/40* | (2011.01) |
| *G02B 6/46* | (2006.01) |
| *H02G 1/12* | (2006.01) |

(52) U.S. Cl.
CPC .............. *B23B 51/08* (2013.01); *B23B 51/02* (2013.01); *H01R 43/28* (2013.01); *G02B 6/46* (2013.01); *H01R 24/40* (2013.01); *H02G 1/1297* (2013.01); *Y10T 29/514* (2015.01)

(58) Field of Classification Search
CPC ................. H01R 9/05; Y10T 29/49174; Y10T 29/49181; Y10T 29/49123; Y10T 29/49218; Y10T 29/514; H02G 1/14; H02G 15/085; H01B 11/18
USPC ...... 29/564.4, 747, 748, 761, 828, 857, 861, 29/874
See application file for complete search history.

(56) References Cited

U.S. PATENT DOCUMENTS

| | | |
|---|---|---|
| 2,743,505 A | 5/1956 | Hill |
| 3,824,026 A | 7/1974 | Gaskins |
| 4,197,628 A | 4/1980 | Conti et al. |
| 4,345,375 A | 8/1982 | Hayward |
| 4,459,881 A | 7/1984 | Hughes, Jr. |
| 4,553,877 A | 11/1985 | Edvardsen |
| 5,023,995 A * | 6/1991 | Kaplan ............... H02G 1/1226 30/90.1 |

(Continued)

*Primary Examiner* — Thiem Phan
(74) *Attorney, Agent, or Firm* — Brad C. Rametta (57) ABSTRACT

Coring augers, tools, methods, and connectors for preparing an end of a coaxial cable for introduction of a flowable medium into the end are disclosed. The disclosed methods and tools may form a frustoconical dielectric portion at an end of the coaxial cable. An annular space formed between the outer conductor and the frustoconical dielectric portion may facilitate the introduction of the flowable medium into the annular space. The disclosed methods and tools may also flare an outer conductor at the end of the coaxial cable and engage the flared outer conductor in a corresponding flared connector.

17 Claims, 9 Drawing Sheets

(56) References Cited

U.S. PATENT DOCUMENTS

| | | | |
|---|---|---|---|
| 5,511,305 | A | 4/1996 | Garner |
| 5,749,270 | A * | 5/1998 | Bourbeau ............ H02G 1/1226 29/566.4 |
| 6,510,610 | B2 | 1/2003 | Losinger |
| 6,637,101 | B2 | 10/2003 | Hathaway et al. |
| 7,694,420 | B2 | 4/2010 | Ehret et al. |
| 7,814,654 | B2 | 10/2010 | Pichler |
| 8,037,599 | B2 | 10/2011 | Pichler |

* cited by examiner

CORING AUGERS AND TOOLS FOR PREPARING AN END OF A COAXIAL CABLE FOR INTRODUCTION OF A FLOWABLE MEDIUM INTO THE END

PRIORITY APPLICATION

This application claims the benefit of priority under 35 U.S.C. §119 of U.S. Provisional Application Ser. No. 62/069,553 filed on Oct. 28, 2014 the content of which is relied upon and incorporated herein by reference in its entirety.

BACKGROUND

Field

The present disclosure generally relates to coaxial cable preparation and, more particularly, to coring augers, tools, methods, and connectors for preparing an end of a coaxial cable for introduction of a flowable medium into the end.

Technical Background

A coaxial cable includes an inner conductor, a dielectric surrounding the inner conductor, and an outer conductor surrounding the dielectric. In some circumstances, it may be desirable to separate and remove the dielectric and inner conductor from the outer conductor. For example, in situations where new fiber optic cable is to be laid in a neighborhood with an existing coaxial cable infrastructure, it may be less expensive and quicker to run the fiber optic cable through the existing coaxial cable infrastructure. In order to run fiber optic cable through an existing coaxial cable infrastructure, the dielectric and inner conductor must be separated and removed from the outer conductor, leaving behind the outer conductor through which the fiber optic cable may be installed.

Accordingly, a need exists for tools, methods, and connectors for preparing an end of a coaxial cable for introduction of a flowable medium into the end.

SUMMARY

In one embodiment, a coring auger includes a drive end, a cutting end, an auger bore, and a spiral flute. The coring auger may be used to prepare an end of a coaxial cable for introduction of a flowable medium into the end. The coaxial cable has an inner conductor, a dielectric surrounding the inner conductor, and an outer conductor surrounding the dielectric. The coring auger longitudinally extends between the drive end and the cutting end. The cutting end has a longitudinally extending inner frustoconical dielectric tapering surface for tapering the dielectric of the end of the coaxial cable. The inner frustoconical dielectric tapering surface tapers inwardly toward the drive end such that a cross-sectional diameter of the inner frustoconical dielectric tapering surface decreases toward the drive end. The auger bore extends longitudinally through the coring auger for receiving the inner conductor of the coaxial cable as the dielectric is cut away from the end of the coaxial cable. The spiral flute helically extends from the cutting end toward the drive end.

In another embodiment, a tool includes a tool body and a coring and flaring assembly. The tool may be used for preparing an end of a coaxial cable for introduction of a flowable medium into the end. The coaxial cable has an inner conductor, a dielectric surrounding the inner conductor, and an outer conductor surrounding the dielectric. The tool body has a cable receipt end and a drive end. The cable receipt end is open for receiving the end of the coaxial cable. The coring and flaring assembly is disposed within the tool body. The coring and flaring assembly includes a coring auger and a flaring member. The coring auger includes a drive end, a cutting end, an auger bore, and a spiral flute. The coring auger longitudinally extends between the drive end and the cutting end. The cutting end has a longitudinally extending inner frustoconical dielectric tapering surface for tapering the dielectric of the end of the coaxial cable. The inner frustoconical dielectric tapering surface tapers inwardly toward the drive end such that a cross-sectional diameter of the inner frustoconical dielectric tapering surface decreases toward the drive end. The auger bore extends longitudinally through the coring auger for receiving the inner conductor of the coaxial cable as the dielectric is cut away from the end of the coaxial cable. The spiral flute helically extends from the cutting end toward the drive end. The flaring member is mechanically coupled to the coring auger. The flaring member includes a plurality of fingers for flaring the outer conductor of the end of the coaxial cable.

In yet another embodiment, a method for preparing an end of a coaxial cable for introduction of a flowable medium into the end includes cutting away a portion of the dielectric from within an outer conductor of the coaxial cable to form a frustoconical dielectric portion. The frustoconical dielectric portion tapers such that a diameter of the frustoconical dielectric portion increases in a direction away from the end of the coaxial cable. The coaxial cable has an inner conductor, the dielectric surrounding the inner conductor, and the outer conductor surrounding the dielectric.

In yet another embodiment, a connector assembly for engaging a frustoconical outer conductor portion of a coaxial cable includes a back nut and a main nut. The back nut extends longitudinally from a main nut engagement end to a distal end. The back nut includes a main nut engagement portion. The main nut engagement portion includes an inner frustoconical engagement surface for engaging the frustoconical outer conductor portion of the coaxial cable. The inner frustoconical engagement surface of the back nut extends from the main nut engagement end toward the distal end and tapers inwardly toward the distal end such that a cross-sectional diameter of the inner frustoconical engagement surface of the back nut decreases toward the distal end. The main nut extends longitudinally from a distal end to a back nut engagement end. The main nut includes a back nut engagement portion. The back nut engagement portion includes an inner frustoconical engagement surface for engaging the frustoconical outer conductor portion of the coaxial cable. The inner frustoconical engagement surface of the main nut extends from the back nut engagement end toward the distal end and tapers outwardly toward the distal end such that a cross-sectional diameter of the inner frustoconical engagement surface of the main nut increases toward the distal end. The frustoconical outer conductor portion of the coaxial cable is sandwiched between the inner frustoconical engagement surface of the main nut and the inner frustoconical engagement surface of the back nut when the back nut and the main nut are assembled.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate embodiments, and together with the description serve to explain principles and operation of the various embodiments.

DETAILED DESCRIPTION

Embodiments of the present disclosure are directed to coring augers, tools, methods, and connectors for preparing an end of a coaxial cable for introduction of a flowable medium into the end. The methods and tools described herein may form a frustoconical dielectric portion at an end of the coaxial cable. An annular space formed between the outer conductor and the frustoconical dielectric portion may facilitate the efficient and reliable introduction of the flowable medium into the annular space for separating the dielectric from the outer conductor along a length of the cable. The methods and tools described herein may also flare an outer conductor at the end of the coaxial cable and engage the flared outer conductor in a corresponding flared connector in order to provide for a reliable mechanical and electrical connection between the outer conductor and the connector. Various coring augers, tools, methods, and connectors for preparing an end of a coaxial cable for introduction of a flowable medium into the end are described in detail below.

Figure 1:
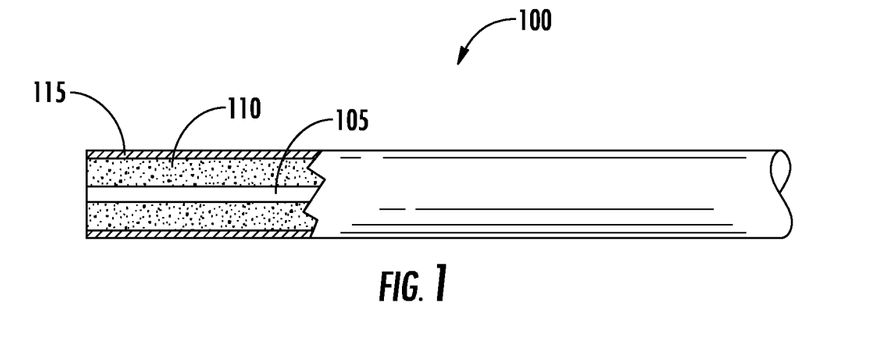
FIG. 1 schematically depicts a partial cross sectional view of a coaxial cable, according to one or more embodiments shown and described herein.

Referring now to FIG. 1, a coaxial cable 100 is schematically depicted. The coaxial cable 100 includes an inner conductor 105, a dielectric 110, and an outer conductor 115. The dielectric 110 surrounds the inner conductor 105. The outer conductor 115 surrounds the dielectric 110. In some embodiments the inner conductor 105 is copper-clad aluminum, though the inner conductor 105 may be a conductor other than copper-clad aluminum (e.g., copper, gold, or the like) in other embodiments. In some embodiments, the dielectric 110 is a plastic, though the dielectric 110 may be an insulator other than plastic in other embodiments. In some embodiments, the outer conductor 115 is aluminum, though the outer conductor 115 may be a conductor other than aluminum in other embodiments. While the coaxial cable 100 depicted in FIG. 1 does not include an outer jacket, it should be understood that in other embodiments the coaxial cable may include an outer jacket formed of plastic or any other insulating material. One method of preparing an end of the coaxial cable 100 for introduction of a flowable medium into the end of the coaxial cable 100 will now be described with reference to FIGS. 2-6.

Figure 2:
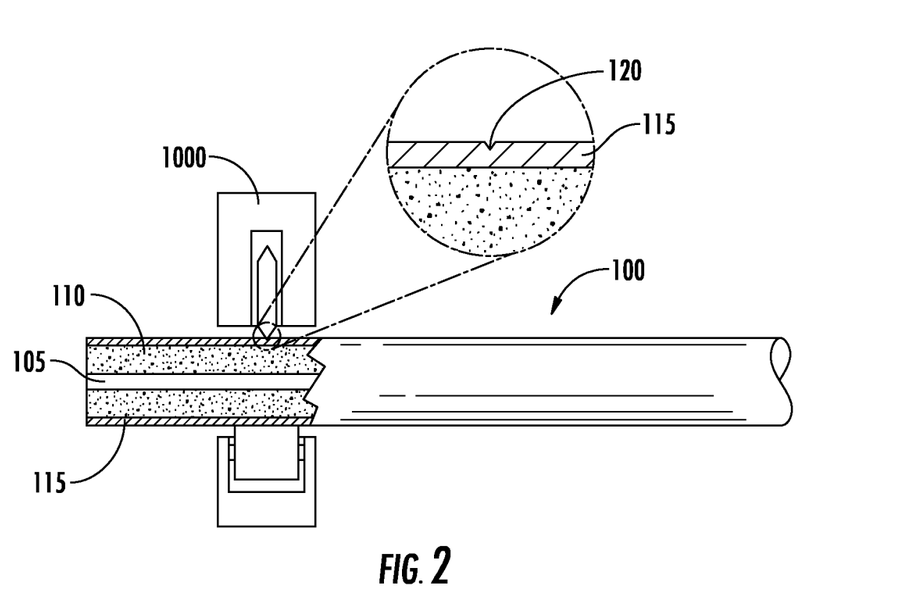
FIG. 2 schematically depicts a partial cross sectional view of a coaxial cable at a first stage of an end preparation process in which an outer conductor of the coaxial cable is scored with a tubing cutter, according to one or more embodiments shown and described herein.

Referring now to FIG. 2, a first stage of a process for preparing an end of the coaxial cable 100 for introduction of a flowable medium into the end is schematically depicted. During the first stage of the end preparation process, the outer conductor 115 of the coaxial cable 100 is scored with a tubing cutter 1000 around a circumference of the outer conductor 115. As depicted in the blown up portion of FIG. 2, scoring the outer conductor 115 forms a scored annular groove 120 in the outer conductor, which facilitates the separation of a portion of the coaxial cable 100 from the body of the coaxial cable 100 as will be described below.

Figure 3:
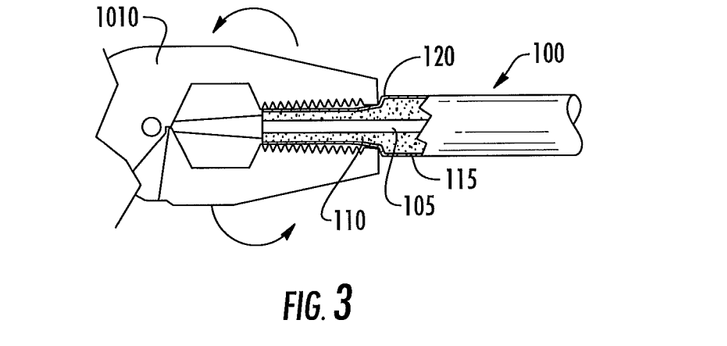
FIG. 3 schematically depicts a partial cross sectional view of a second stage of an end preparation process in which the end of the coaxial cable is grasped and twisted with a pair of pliers, according to one or more embodiments shown and described herein.

Referring now to FIG. 3, a second stage of a process for preparing the end of the coaxial cable 100 for introduction of a flowable medium into the end is schematically depicted. During the second stage of the end preparation process, the portion of the coaxial cable extending up to the scored annular groove 120 is grasped and crushed with a pair of pliers 1010.

Figure 4:
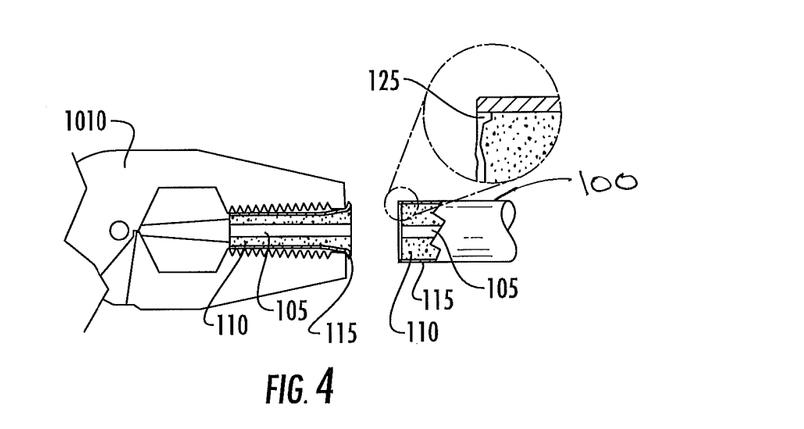
FIG. 4 schematically depicts a partial cross sectional view of a third stage of an end preparation process in which a portion of the coaxial cable is pulled apart from the body of the coaxial cable, according to one or more embodiments shown and described herein.

Referring now to FIG. 4, a third stage of a process for preparing the end of the coaxial cable 100 for introduction of a flowable medium into the end is schematically depicted. During the third stage of the end preparation process, the pliers 1010 are used to twist the grasped portion and separate the grasped portion from the body of the coaxial cable 100. When the portion of the coaxial cable 100 grasped by the pliers 1010 is separated from the body of the coaxial cable 100, an irregular annular space 125 is created between the dielectric 110 and the outer conductor 115, through which the flowable medium may be introduced to separate the dielectric 110 from the outer conductor 115.

Figure 5:
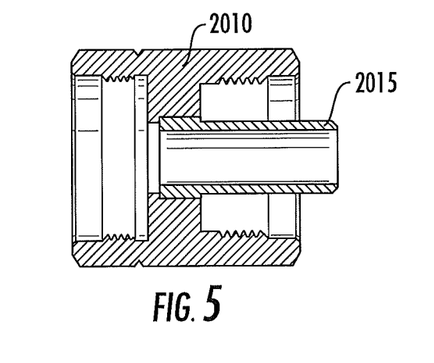
FIG. 5 schematically depicts a cross sectional view of a main nut of a coaxial connector, according to one or more embodiments shown and described herein.

Referring now to FIG. 5, a main nut 2010 is schematically depicted. The main nut 2010 includes an internal support sleeve 2015 over which an outer conductor of a coaxial cable may be inserted to provide support to the coaxial cable. However, the end of the coaxial cable prepared according to the process of FIGS. 2-4 includes the dielectric 110 extending up to the end, which would prevent the outer conductor of the coaxial cable from being inserted over the internal support sleeve 2015. Accordingly, the main nut 2010 may be modified by removing the internal support sleeve 2015 such that the end of the coaxial cable prepared according to the process of FIGS. 2-4 may be inserted through the main nut 2010.

Figure 6:
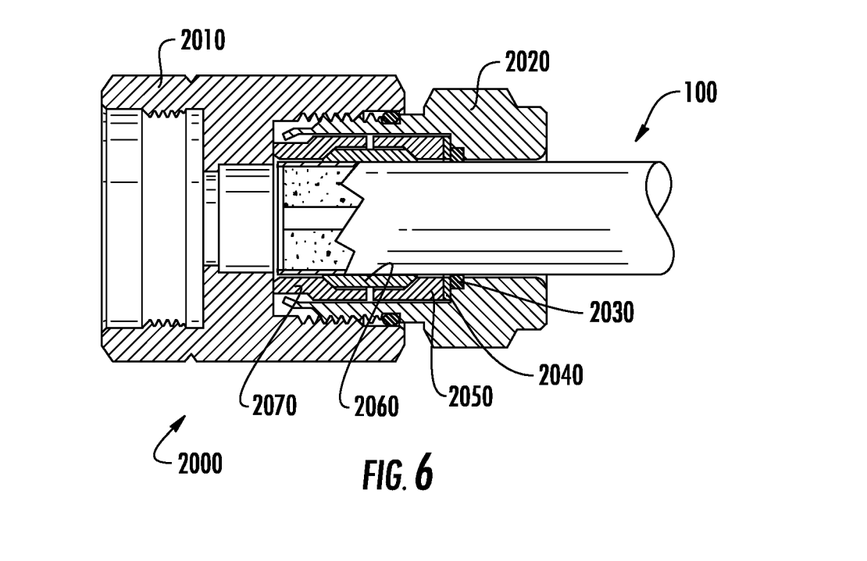
FIG. 6 schematically depicts a partial cross sectional view of a coaxial connector including a main nut and a back nut installed on an end of a coaxial cable, according to one or more embodiments shown and described herein.

Referring now to FIG. 6, a connector assembly 2000 including the main nut 2010 of FIG. 5 (without the internal support sleeve 2015) and a back nut 2020 may be installed on the end of the coaxial cable 100 as prepared in the process described above with reference to FIGS. 2-4. The back nut 2020 includes an O-ring 2030, a washer 2040, a rear compression ring 2050, a ferrule 2060, and a front compression ring 2070 for securing and sealing the coaxial cable 100 within the back nut 2020. The grasping ability of the ferrule 2060 may be adversely affected by the removal of the internal support sleeve 2015 (as described above) because when the main nut 2010 does not include the internal support sleeve 2015, the ferrule 2060 cannot sandwich the outer conductor 115 of the coaxial cable 100 against the internal support sleeve 2015, thereby limiting the ability of the ferrule 2060 to effectively secure the coaxial cable 100. Such an arrangement may undesirably allow the outer conductor 115 to collapse and may result in the outer conductor 115 becoming unreliable under pressures exerted when a flowable medium is introduced into the coaxial cable 100 for separating the dielectric 110 from the outer conductor 115. Furthermore, installing such a connector assembly on the prepared end of the coaxial cable 100 may adversely affect the long term reliability of the attachment between the outer conductor 115 and the connector assembly 2000, or may adversely affect the electrical grounding between the connector assembly 2000 and the outer conductor 115. Furthermore, using such modified connectors may result in the utilization of a number of extraneous components, which may increase cost.

When a flowable medium (e.g., a fluid medium such as hydraulic fluid, a gas medium such as air, or the like) is introduced into the end of the coaxial cable 100 when the connector assembly 2000 is installed, the irregular annular space 125 (See FIG. 4) may provide for a nonuniform and inefficient area to introduce the flowable medium for separating out the cable core. Accordingly, described herein are a tool and method for forming an annular space between the outer conductor and a frustoconical dielectric portion that better facilitates the introduction of the flowable medium in a more precise and targeted manner in order to separate the dielectric 110 from the outer conductor 115. It may be desirable to flare the outer conductor outward and engage the flared outer conductor in a corresponding flared connector in order to provide a reliable mechanical and electrical connection between the outer conductor 115 and the connector. The tool and method for forming the annular space between the outer conductor and the frustoconical dielectric portion, as well as the tool and method for flaring the outer conductor of the connector will now be described with reference to FIGS. 7-18.

Figure 7:
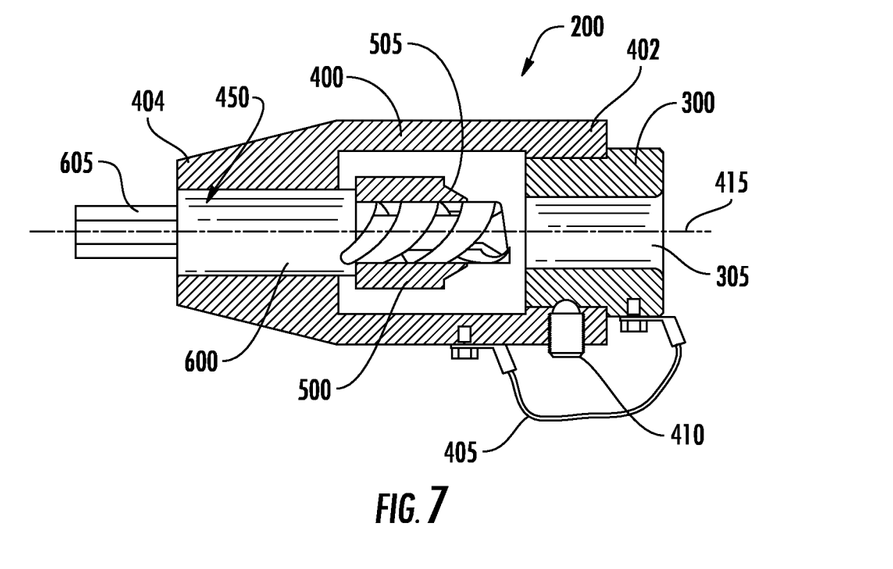
FIG. 7 schematically depicts a partial cross sectional view of a tool for preparing an end of a coaxial cable for introduction of a flowable medium into the end, according to one or more embodiments shown and described herein.

Referring now to FIG. 7, a tool 200 for preparing an end of a coaxial cable for introduction of a flowable medium into the end is schematically depicted. The tool 200 includes a tool body 400, a coring and flaring assembly 450, a split bushing 300, and a tether 405. The tool body 400 extends longitudinally from a drive end 404 to a cable receipt end 402. The tool body 400 is generally axially symmetric about a longitudinal axis 415, though other embodiments may not be axially symmetric. The cable receipt end 402 is open for receiving the end of a coaxial cable. The coring and flaring assembly 450 is disposed within the tool body 400. The coring and flaring assembly 450 includes a coring auger 600 for removing a portion of the dielectric 110 from within the outer conductor 115 and a flaring member 500 for flaring the outer conductor 115, as will be described in detail below. A drive end 605 of the coring auger 600 longitudinally protrudes from the drive end 404 of the tool body 400 such that the drive end 605 of the coring auger 600 may be coupled to a drill for rotating the coring auger 600. The split bushing 300 is retained within the tool body 400 by a bushing retention member 410. The split bushing 300 may guide the coaxial cable 100 into engagement with the coring auger 600 and the flaring member 500 for coring and flaring the end of the coaxial cable 100. The tether 405 is attached to the tool body 400 and attached to the split bushing 300. The tether 405 tethers the split bushing 300 to the tool body 400 to avoid the accidental dropping or loss of the split bushing 300.

Figure 8:
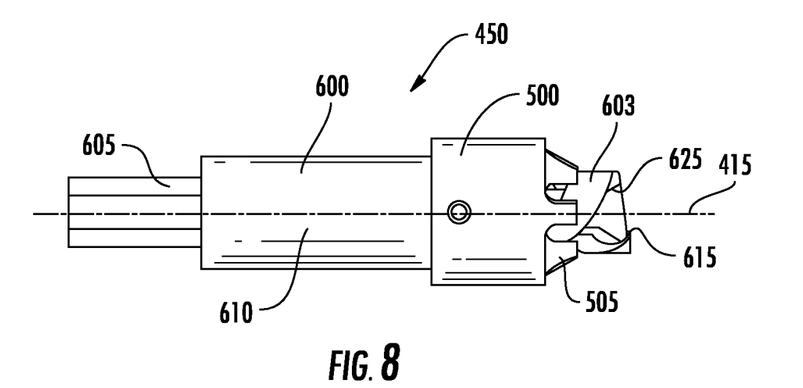
FIG. 8 schematically depicts a perspective side view of a coring and flaring assembly, according to one or more embodiments shown and described herein.

Referring now to FIG. 8, the coring and flaring assembly 450 of FIG. 7 is schematically depicted, further illustrating additional features of the coring and flaring assembly 450. The coring and flaring assembly 450 includes the coring auger 600 and the flaring member 500.

Figure 9:
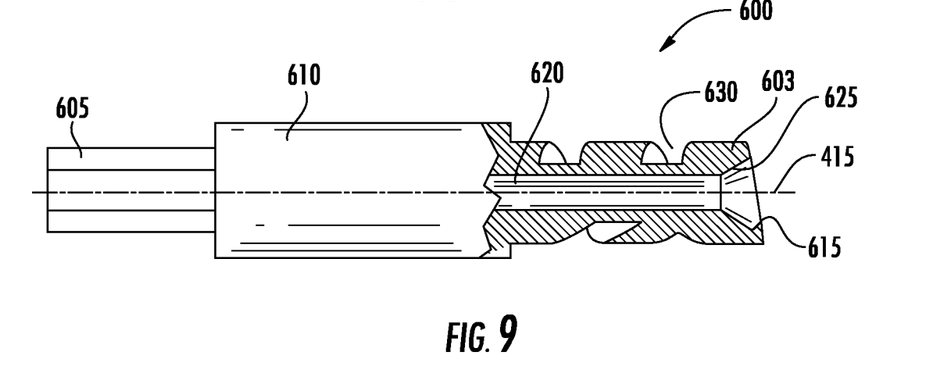
FIG. 9 schematically depicts a partial cross sectional view of a coring auger, according to one or more embodiments shown and described herein.

Referring now to FIG. 8 in conjunction with FIG. 9, the coring auger 600 includes a drive end 605, a shank 610, a spiral flute 630, a cutting end 603, and an auger bore 620. The coring auger 600 longitudinally extends between the drive end 605 and the cutting end 603. The cutting end 603 includes a cutting edge 615 for cutting away the dielectric 110 from within the outer conductor 115 of an end of the coaxial cable 100. The cutting end 603 also includes an inner frustoconical dielectric tapering surface 625 for tapering the dielectric 110 of the end of the coaxial cable 100 as the dielectric 110 is cut away. The inner frustoconical dielectric tapering surface 625 longitudinally extends along a longitudinal axis 415. The inner frustoconical dielectric tapering surface 625 tapers inwardly toward the drive end 605 such that a cross-sectional diameter (i.e. a diameter of a cross section taken perpendicular to the longitudinal axis 415) of the inner frustoconical dielectric tapering surface 625 decreases toward the drive end 605. The auger bore 620 extends longitudinally through the coring auger 600. The auger bore 620 has a bore diameter greater than an inner conductor diameter of the inner conductor 105 of the coaxial cable 100 such that the auger bore 620 is configured to receive the inner conductor 105 of the coaxial cable 100 as the dielectric 110 is cut away from the end of the coaxial cable 100. The spiral flute 630 helically extends from the cutting end 603 toward the drive end 605.

Figure 8A:
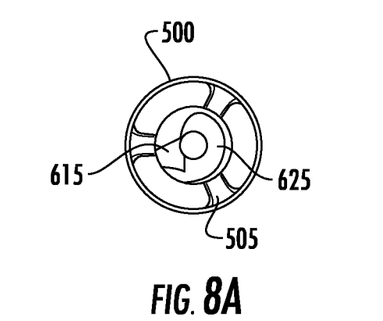
FIG. 8A schematically depicts a perspective end view of the coring and flaring assembly of FIG. 8, according to one or more embodiments shown and described herein.

Referring now to FIG. 8 (depicting a perspective side view of the coring and flaring assembly 450) and FIG. 8A (depicting a perspective end view of the coring and flaring assembly 450), the flaring member 500 is mechanically coupled to the coring auger 600. Specifically, in the embodiment depicted in FIGS. 8-8A, the flaring member 500 is mechanically coupled to the shank 610 of the coring auger 600. However, it should be understood that in other embodiments the flaring member 500 may be integrally formed with the coring auger 600. The flaring member 500 includes a plurality of fingers 505 for flaring the outer conductor 115 of the end of the coaxial cable 100, as will be described below. The plurality of fingers 505 are circumferentially spaced apart and tapered. A flaring member 500 that includes a plurality of fingers 505 for flaring the outer conductor 115 of the end of the coaxial cable 100, as shown in the figures, may facilitate the flaring of the outer conductor with lower axial force than would be required if the flaring member 500 included an annular tapering surface. However, some embodiments of the flaring member 500 include an annular tapering surface instead of the plurality of fingers 505. The plurality of fingers 505 are equally spaced apart around the circumference of the flaring member 500. By equally spacing the plurality of fingers 505 around the circumference of the flaring member 500, the flaring member 500 may exert concentrated but equally distributed pressure against the outer conductor 115 to force the outer conductor 115 into a predetermined shape without cracking or otherwise distorting the outer conductor 115. However, it should be understood that in some embodiments the plurality of fingers 505 may not be equally spaced around the circumference of the flaring member 500.

Figure 16:
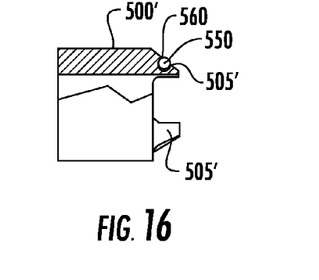
FIG. 16 schematically depicts a partial cross sectional view of a flaring member including a plurality of fingers having forming members, according to one or more embodiments shown and described herein.
Figure 16A:
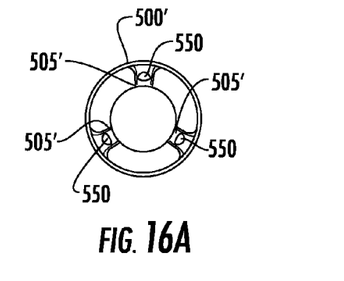
FIG. 16A is a perspective front view of the flaring member of FIG. 16, according to one or more embodiments shown and described herein.

Referring now to FIGS. 16 and 16A, an embodiment of a flaring member 500' is schematically depicted. The flaring member 500' includes a plurality of fingers 505' for flaring the outer conductor 115 of the end of the coaxial cable 100. The plurality of fingers 505' are circumferentially spaced apart and tapered. The plurality of fingers 505' are equally spaced apart around the circumference of the flaring member 500', though in other embodiments the plurality of fingers 505' are not equally spaced apart. Each of the plurality of fingers 505' includes a socket 560 that is inset within the tapered surface of the finger. The socket 560 retains a forming member 550 retained in the socket 560. In some embodiments, the forming member 550 is a sphere configured to rotate though stay retained within the socket 560 as the outer conductor 115 passes over the flaring member 500. In some embodiments, the sphere may be formed from a hard material, such as steel. Such forming members 550 may exert less stress on the outer conductor 115 of the coaxial cable 100 and may reduce the friction on the outer conductor 115 as the outer conductor is flared by the plurality of fingers 505.' However, it should be understood that some embodiments do not include the socket 560 or the forming member 550, such as the embodiment of the flaring member 500 depicted in FIG. 8 and described above.

Figure 13:
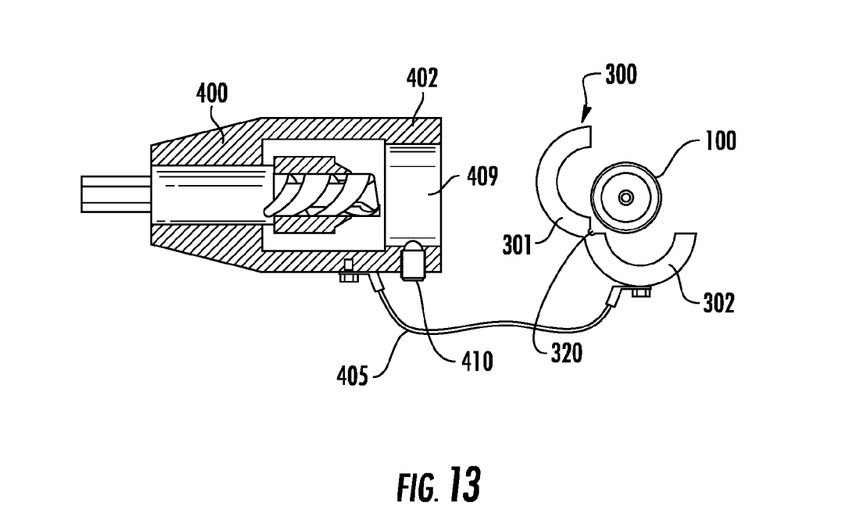
FIG. 13 schematically depicts a partial cross sectional view of the removal of a split bushing from around a coaxial cable, according to one or more embodiments shown and described herein.

Referring now to FIG. 13, the tool body 400 includes a bushing receipt slot 409 at the cable receipt end 402. The bushing retention member 410 disposed within the bushing receipt slot 409 may be used to facilitate the retention of the split bushing 300 within the bushing receipt slot 409, though some embodiments may not include the bushing retention member 410. The split bushing 300 is configured to be removably retained in the bushing receipt slot 409. In some embodiments, the split bushing 300 may include a bushing retention cavity into which the bushing retention member 410, which protrudes from the bushing receipt slot 409, may engage. The split bushing 300 includes a first portion 301 and a second portion 302. The first portion 301 is hingedly coupled to the second portion 302 by a hinge 320. When the split bushing 300 is in a closed configuration (e.g., as depicted in FIG. 7), a split bushing bore is defined between the first portion and the second portion such that the split bushing 300 may guide the coaxial cable into the tool body 400. When the split bushing 300 is in an open configuration (e.g., as depicted in FIG. 13), the coaxial cable 100 may be removed from retention by the split bushing 300.

Figure 10:
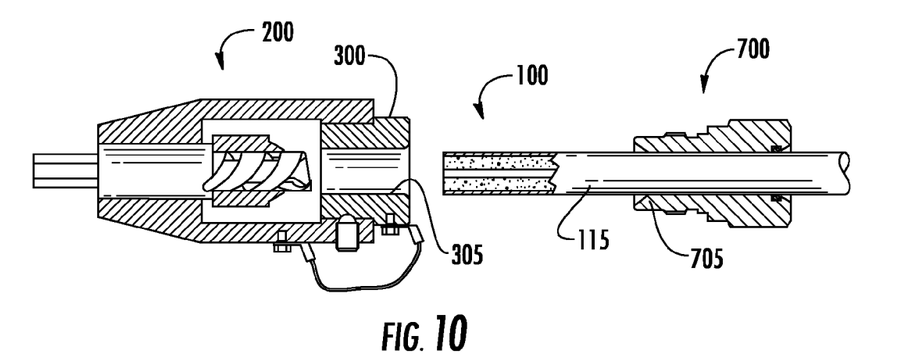
FIG. 10 schematically depicts a partial cross sectional view of a coaxial cable with a back nut advanced onto a body of the coaxial cable that is ready for coring and flaring, according to one or more embodiments shown and described herein.

A method of using the tool 200 to core and/or flare an end of the coaxial cable 100 will now be described. Referring now to FIG. 10, a back nut 700 may be advanced onto a body of the coaxial cable 100 before the coaxial cable 100 is inserted into the tool 200. In embodiments in which the outer conductor 115 of the end of the coaxial cable 100 is flared outward, it may be desirable to advance the back nut 700 onto the cable body before flaring the coaxial cable 100 with the tool 200 because a diameter of the outer conductor 115 may exceed a diameter of a bore 705 of the back nut 700 after flaring. After the back nut 700 is advanced onto the body of the coaxial cable 100, the coaxial cable may be aligned with the tool 200.

Figure 11:
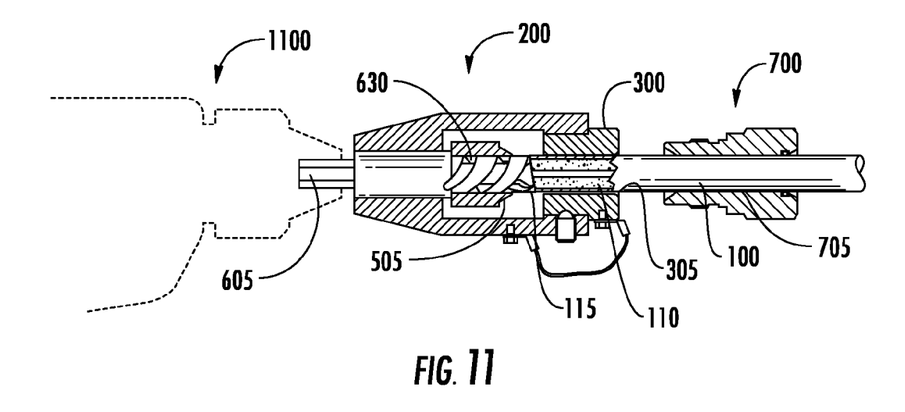
FIG. 11 schematically depicts a partial cross sectional view of a coaxial cable being cored and flared, according to one or more embodiments shown and described herein.

Referring now to FIG. 11, the coaxial cable 100 is passed through a bore 305 of the split bushing 300. A rotating means, such as a drill 1100 is coupled to the drive end of the coring auger 600 such that the coring auger 600 rotates. The coring auger 600 is then axially and rotationally driven relative to the coaxial cable 100 to cut away a portion of the dielectric 110 from within the outer conductor 115 to form a frustoconical dielectric portion and to form a corresponding annular space between the outer conductor and the frustoconical dielectric portion. After being cut away, the removed dielectric 110 is conveyed away from the cutting edge of the coring auger 600 by the spiral flute 630. Continued axial and rotational driving of the coring auger 600 relative to the coaxial cable 100 brings the outer conductor 115 of the coaxial cable 100 into engagement with the plurality of fingers 505 of the flaring member 500, which flare the outer conductor 115 radially outward to have a frustoconical shape. When flared outward, the outer conductor 115 at the end of the coaxial cable 100 has a larger diameter than before flaring. As noted above, the plurality of spaced apart fingers allow the flaring member 500 to exert substantially concentrated and equally distributed pressure against the outer conductor 115 to flare the outer conductor 115 without cracking or otherwise distorting the outer conductor 115. In some embodiments, a lubricant may be applied to one or more of the plurality of fingers 505 to facilitates the flaring process and prevent galling of the outer conductor 115.

Figure 12:
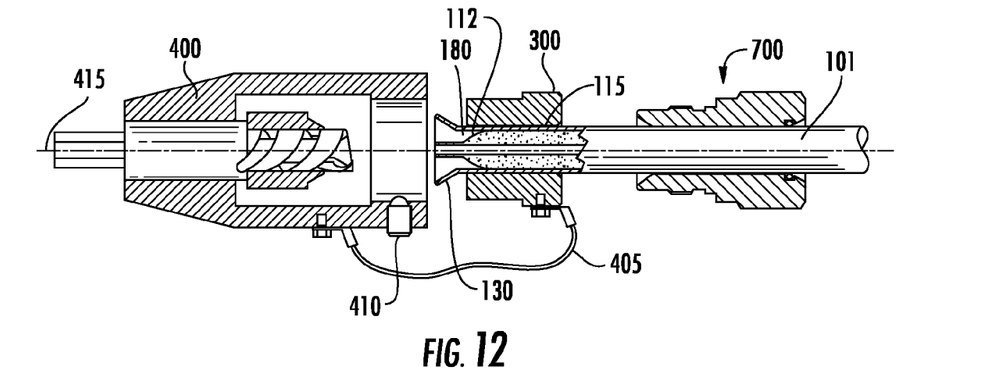
FIG. 12 schematically depicts a partial cross sectional view of a coaxial cable after being cored and flared, according to one or more embodiments shown and described herein.

Referring now to FIG. 12, after the end of the coaxial cable 100 is cored and flared as described above with respect to FIG. 11, the split bushing 300 and the coaxial cable 100 may be pulled away from the tool body 400. As can be seen, after the end of the coaxial cable 100 is cored and flared, the coaxial cable 100 includes a frustoconical dielectric portion 112 and a corresponding annular space 180 between the outer conductor 115 and the frustoconical dielectric portion 112. The frustoconical dielectric portion 112 is tapered such that a cross-sectional diameter (i.e. a diameter of a cross section taken perpendicular to the longitudinal axis 415) of the frustoconical dielectric portion 112 increases in a direction away from the end of the coaxial cable 100 and toward a body 101 of the coaxial cable 100. The coaxial cable 100 also include a frustoconical outer conductor portion 130 that is tapered such that a cross-sectional diameter (i.e. a diameter of a cross section taken perpendicular to the longitudinal axis 415) of the frustoconical outer conductor portion 130 decreases in a direction away from the end of the coaxial cable 100 and toward a body 101 of the coaxial cable 100.

Referring now to FIG. 13, after the split bushing 300 and the coaxial cable 100 is pulled away from the tool body 400, the split bushing 300 may be opened by rotating the first portion 301 relative to the second portion 302 about the hinge 320 such that the split bushing 300 is in an open configuration. When the split bushing 300 is in the open configuration, the coaxial cable 100 can be removed from the split bushing 300 and the hinge 320 of the split bushing 300 may be closed and the split bushing 300 returned to the bushing receipt slot 409 so that the tool 200 may be used to prepare the end of another coaxial cable.

Figure 14:
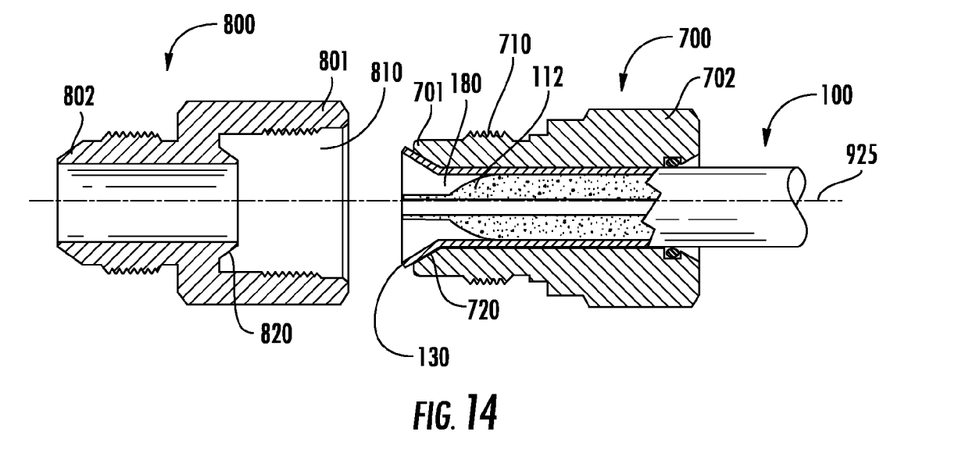
FIG. 14 schematically depicts a partial cross sectional view of a cored and flared coaxial cable with a back nut advanced to the end of the cable, according to one or more embodiments shown and described herein.

Referring now to FIG. 14, the back nut 700 may then be advanced over the coaxial cable 100 to engage the frustoconical outer conductor portion 130. The back nut 700 extends longitudinally from a main nut engagement end 701 to a distal end 702. The back nut 700 includes an externally threaded main nut engagement portion 710. The externally threaded main nut engagement portion 710 includes an inner frustoconical engagement surface 720 for engaging the frustoconical outer conductor portion 130 of the coaxial cable 100. The inner frustoconical engagement surface 720 extends from the main nut engagement end 701 toward the distal end 702 and tapers inwardly toward the distal end 702 such that a cross-sectional diameter of the inner frustoconical engagement surface 720 decreases toward the distal end 702.

The back nut 700 and the coaxial cable 100 may then be aligned with the main nut 800, as shown in FIG. 14. The main nut 800 extends longitudinally from a distal end 802 to a back nut engagement end 801. The main nut 800 includes an internally threaded back nut engagement portion 810. The internally threaded back nut engagement portion 810 is configured to threadedly engage the externally threaded main nut engagement portion 710 of the back nut 700 when the back nut 700 and main nut 800 are assembled into a connector assembly. The internally threaded back nut engagement portion 810 includes an inner frustoconical engagement surface 820 for engaging the frustoconical outer conductor portion 130 of the coaxial cable 100 and for sandwiching the frustoconical outer conductor portion 130 of the coaxial cable 100 between the inner frustoconical engagement surface 820 of the main nut 800 and the inner frustoconical engagement surface 720 of the back nut 700 when the back nut 700 and the main nut 800 are assembled. The inner frustoconical engagement surface 820 extends from the back nut engagement end 801 toward the distal end 802 and tapers outwardly toward the distal end 802 such that a cross-sectional diameter of the inner frustoconical engagement surface 820 increases toward the distal end 802.

Figure 15:
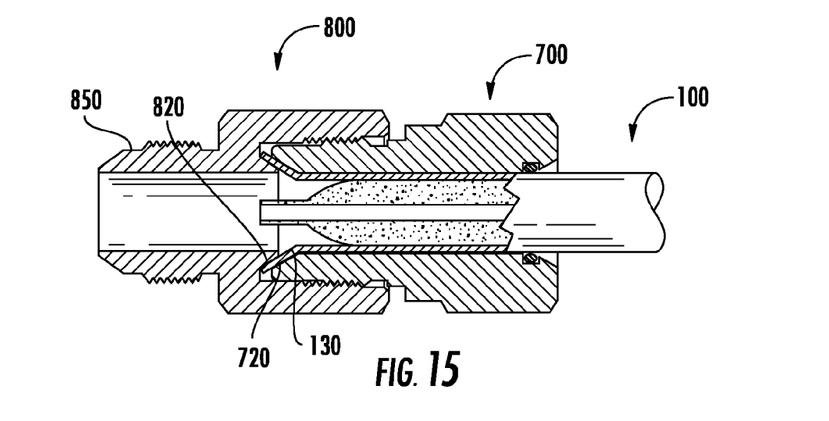
FIG. 15 schematically depicts a partial cross sectional view of a coaxial connector including a main nut and a back nut installed on an end of a cored and flared coaxial cable, according to one or more embodiment shown and described herein.

Referring now to FIG. 15, the main nut 800 and the back nut 700 may be assembled into a connector assembly such that the frustoconical outer conductor portion 130 of the coaxial cable 100 is sandwiched between the inner frustoconical engagement surface 820 of the main nut 800 and the inner frustoconical engagement surface 720 of the back nut 700. By flaring the coaxial cable 100 to form the frustoconical outer conductor portion 130 and sandwiching the frustoconical outer conductor portion 130 between the inner frustoconical engagement surface 820 of the main nut 800 and the inner frustoconical engagement surface 720 of the back nut 700 when the main nut 800 and the back nut 700 are installed on the coaxial cable 100, a reliable mechanical and electrical connection may be established between the connector assembly and the outer conductor of the coaxial cable 100.

While the back nut engagement portion 810 of the main nut 800 is internally threaded and the main nut engagement portion 710 of the back nut 700 is externally threaded, it should be understood that in some embodiments the back nut engagement portion 810 and the main nut engagement portion 710 may not be threaded, such as embodiments in which the back nut 700 and the main nut 800 are configured to be assembled with press-fit or compression techniques.

Still referring to FIG. 15, once the back nut 700 and main nut 800 are installed on the coaxial cable 100, a supply line may be coupled to a coupling portion 850 of the main nut 800 and an hydraulic fluid (or any other flowable medium) may be introduced into the annular space formed between the outer conductor and the frustoconical dielectric portion to facilitate the efficient, precise, targeted, and reliable introduction of the flowable medium into the annular space in order to separate the dielectric from the outer conductor along a length of the cable.

Figure 17:
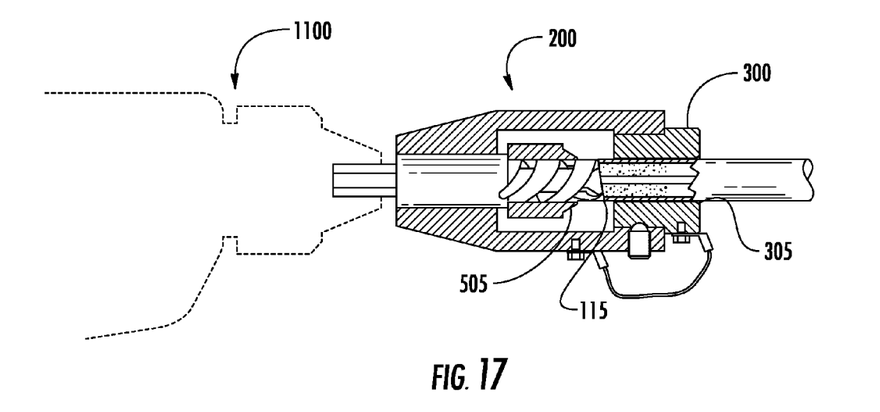
FIG. 17 schematically depicts a partial cross sectional view of a coaxial cable being cored but not flared, according to one or more embodiments shown and described herein.
Figure 18:
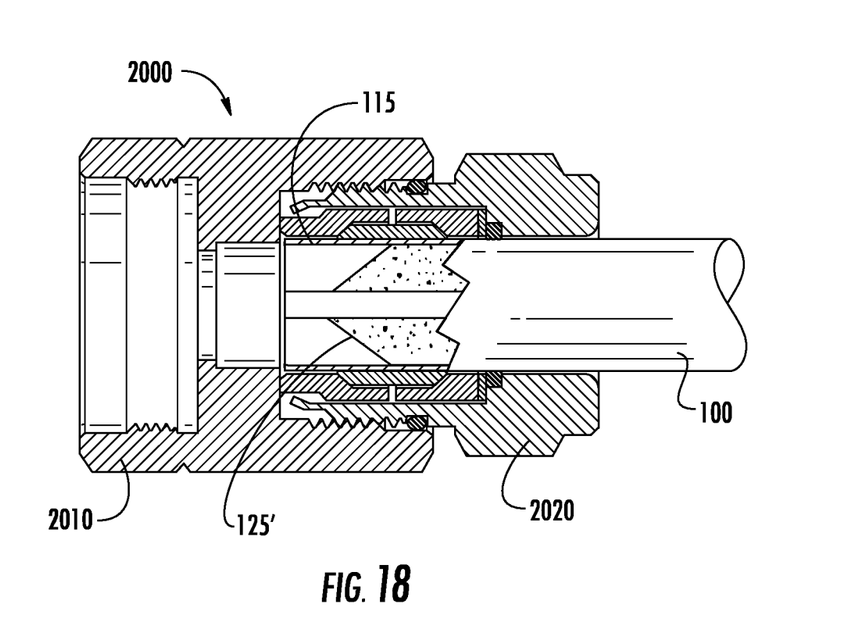
FIG. 18 schematically depicts a partial cross sectional view of a coaxial connector including a main nut and a back nut installed on an end of a cored coaxial cable, according to one or more embodiments shown and described herein.

In some embodiments, the outer conductor 115 of the coaxial cable 100 may not be flared, such as in embodiments in which the tool 200 is only advanced far enough relative to the coaxial cable 100 to remove a portion of the dielectric 110 but not far enough that the outer conductor 115 engages the flaring member 500. For example, as shown in FIG. 17, the tool 200 may be stopped short of flaring the outer conductor 115, but may still remove a portion of the dielectric 110 to form the frustoconical dielectric portion and the corresponding annular space between the outer conductor 115 and the frustoconical dielectric portion. Such a cable that includes the frustoconical dielectric portion, but does not have a flared outer conductor at the end of the cable may be installed in the connector assembly 2000 of FIG. 6, as shown in FIG. 18.

While embodiments of the tool 200 described herein include the tool body 400, the coring and flaring assembly 450, the split bushing 300, and the tether 405, other embodiments of the tool 200 do not include one or more of these components. For example, some embodiments do not include the split bushing 300 and the tether 405, such as embodiments in which the tool 200 includes a bore sized to receive and guide the coaxial cable 100 to the coring to be cored and flared by the coring and flaring assembly 450. Furthermore, some embodiments of the tool 200 may not include the coring auger 600, such as embodiments that only flare the outer conductor of the coaxial cable 100 with the flaring member 500. Some embodiments of the tool 200 may not include the flaring member 500, such as embodiments that only core the dielectric 110 from the end of the coaxial cable 100. The coring and flaring assembly 450 is not required to be disposed within or coupled to a tool body, such as in embodiments in which the coring and flaring assembly 450 is an independent component that may be used to core and flare the end of the coaxial cable 100. Furthermore, in some embodiments, one or more of the coring auger 600 and the flaring member 500 may be used independently of one another, such as embodiments in which one or more of the coring auger 600 and the flaring member 500 are separate components.

It should now be understood that embodiments described herein are directed to methods and tools for preparing an end of a coaxial cable for introduction of a flowable medium into the end. In particular, the methods and tools described herein may form a frustoconical dielectric portion at an end of the coaxial cable. An annular space formed between the outer conductor and the frustoconical dielectric portion may facilitate the efficient, precise, targeted, and reliable introduction of the flowable medium into the annular space for separating the dielectric from the outer conductor along a length of the cable. The methods and tools described herein may also flare an outer conductor at the end of the coaxial cable and engage the flared outer conductor in a corresponding flared connector in order to provide for a reliable mechanical and electrical connection between the outer conductor and the connector. Furthermore, the embodiments described herein facilitate long term mechanical reliability of the junction between the coaxial cable and the junction, facilitate long term electrical reliability of the grounding of the outer conductor of the coaxial cable to the connector, and may eliminate extraneous components resulting in cost improvement.

For the purposes of describing and defining the subject matter of the disclosure it is noted that the term "substantially" is utilized herein to represent the inherent degree of uncertainty that may be attributed to any quantitative comparison, value, measurement, or other representation.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the disclosure. Since modifications, combinations, sub-combinations and variations of the disclosed embodiments incorporating the spirit and substance of the disclosure may occur to persons skilled in the art, the embodiments disclosed herein should be construed to include everything within the scope of the appended claims and their equivalents.

What is claimed is:

1. A coring auger for preparing an end of a coaxial cable for introduction of a flowable medium into the end, the coaxial cable having an inner conductor, a dielectric surrounding the inner conductor, and an outer conductor surrounding the dielectric, the coring auger comprising a drive end, a cutting end, an auger bore, and a spiral flute, wherein:
   the coring auger longitudinally extends between the drive end and the cutting end;
   the cutting end has a longitudinally extending inner frustoconical dielectric tapering surface for tapering the dielectric of the end of the coaxial cable;
   the inner frustoconical dielectric tapering surface tapers inwardly toward the drive end such that a cross-sectional diameter of the inner frustoconical dielectric tapering surface decreases toward the drive end;
   the auger bore extends longitudinally through the coring auger for receiving the inner conductor of the coaxial cable as the dielectric is cut away from the end of the coaxial cable; and
   the spiral flute helically extends from the cutting end toward the drive end.

2. A coring and flaring assembly comprising the coring auger of claim 1 and a flaring member mechanically coupled to the coring auger, the flaring member including a plurality of fingers for flaring the outer conductor of the end of the coaxial cable.

3. The coring and flaring assembly of claim 2, wherein the plurality of fingers are circumferentially spaced apart and tapered.

4. The coring and flaring assembly of claim 3, wherein the pluralities of fingers are equally spaced apart.

5. The coring and flaring assembly of claim 2, wherein each of the plurality of fingers includes a socket and a forming member retained in the socket.

6. The coring and flaring assembly of claim 5, wherein the forming member is a sphere configured to rotate within the socket.

7. The coring and flaring assembly of claim 2, the coring auger further comprising a shank, wherein the flaring member is mechanically coupled to the shank.

8. A tool for preparing an end of a coaxial cable for introduction of a flowable medium into the end, the coaxial cable having an inner conductor, a dielectric surrounding the inner conductor, and an outer conductor surrounding the dielectric, the tool comprising:
   a tool body having a cable receipt end and a drive end, the cable receipt end being open for receiving the end of the coaxial cable;
   a coring and flaring assembly disposed within the tool body, the coring and flaring assembly including a coring auger and a flaring member, wherein:
   the coring auger comprises a drive end, a cutting end, an auger bore, and a spiral flute;
   the coring auger longitudinally extends between the drive end and the cutting end;
   the cutting end has a longitudinally extending inner frustoconical dielectric tapering surface for tapering the dielectric of the end of the coaxial cable;
   the inner frustoconical dielectric tapering surface tapers inwardly toward the drive end such that a cross-sectional diameter of the inner frustoconical dielectric tapering surface decreases toward the drive end;
   the auger bore extends longitudinally through the coring auger for receiving the inner conductor of the coaxial cable as the dielectric is cut away from the end of the coaxial cable;
   the spiral flute helically extends from the cutting end toward the drive end;
   the flaring member is mechanically coupled to the coring auger; and
   the flaring member includes a plurality of fingers for flaring the outer conductor of the end of the coaxial cable.

9. The tool of claim 8, wherein the plurality of fingers are circumferentially spaced apart and tapered.

10. The tool of claim 9, wherein the plurality of fingers are equally spaced apart.

11. The tool of claim 8, wherein each of the plurality of fingers includes a socket and a forming member retained in the socket.

12. The tool of claim 11, wherein the forming member is a sphere configured to rotate within the socket.

13. The tool of claim 8, further comprising:
a bushing receipt slot at the cable receipt end of the tool body; and
a split bushing configured to be removably retained in the bushing receipt slot, the split bushing including a first portion, a second portion, and a hinge, wherein the first portion is hingedly coupled to the second portion by the hinge, wherein a split bushing bore is defined between the first portion and the second portion when the split bushing is in a closed configuration.

14. The tool of claim 13, further comprising a retention member disposed within the bushing receipt slot for retaining the split bushing in the bushing receipt slot.

15. The tool of claim 13, further comprising a tether attached to the tool body and attached to the split bushing for tethering the split bushing to the tool body.

16. The tool of claim 8, wherein the drive end of the coring auger longitudinally protrudes from the drive end of the tool body.

17. The tool of claim 8, the coring auger further comprising a shank, wherein the flaring member is mechanically coupled to the shank.

* * * * *